United States Patent [19]
Caffell

[11] Patent Number: 5,769,069
[45] Date of Patent: Jun. 23, 1998

[54] LOW FLOW-RATE PUMP

[75] Inventor: Anthony Caffell, Toronto, Canada

[73] Assignee: Her Majesty the Queen in right of Canada, as represented by the Minister of Natural Resources, Ottawa, Canada

[21] Appl. No.: 471,826

[22] Filed: Jun. 7, 1995

[51] Int. Cl.[6] .......................... A61B 19/00; F04D 13/06; F04B 17/00
[52] U.S. Cl. ...................... 126/634; 417/423.7; 417/356; 415/102; 415/214.1
[58] Field of Search ............................ 417/423.7, 423.12, 417/423.14, 356, 351; 415/900, 102, 214.1; 126/634

[56] References Cited

U.S. PATENT DOCUMENTS

| | | |
|---|---|---|
| 3,970,408 | 7/1976 | Rafferty et al. .......................... 415/900 |
| 4,129,118 | 12/1978 | Banke . |
| 5,195,877 | 3/1993 | Kletschka . |

FOREIGN PATENT DOCUMENTS

| | | |
|---|---|---|
| 582036 | 11/1946 | United Kingdom . |
| WO 88/07842 | 10/1988 | WIPO . |
| WO 91/01584 | 2/1991 | WIPO . |
| WO 92/06301 | 4/1992 | WIPO . |

*Primary Examiner*—Carl D. Price
*Attorney, Agent, or Firm*—Randall J. Knuth

[57] ABSTRACT

A relatively power efficient, low flow-rate pump comprises an integral rotor-impeller on a hollow shaft which forms the rotational axis. The rotor-impeller is a permanently magnetized with alternating poles about its periphery faces and at least two channels extend through the rotor-impeller from the interior of the hollow shaft to the periphery of the rotor-impeller. The diameter of the rotor-impeller is in the range of from about 5 mm to about 30 mm and the operating rotational speed of the rotor-impeller is from about 10,000 RPM to about 50,000 RPM.

11 Claims, 9 Drawing Sheets

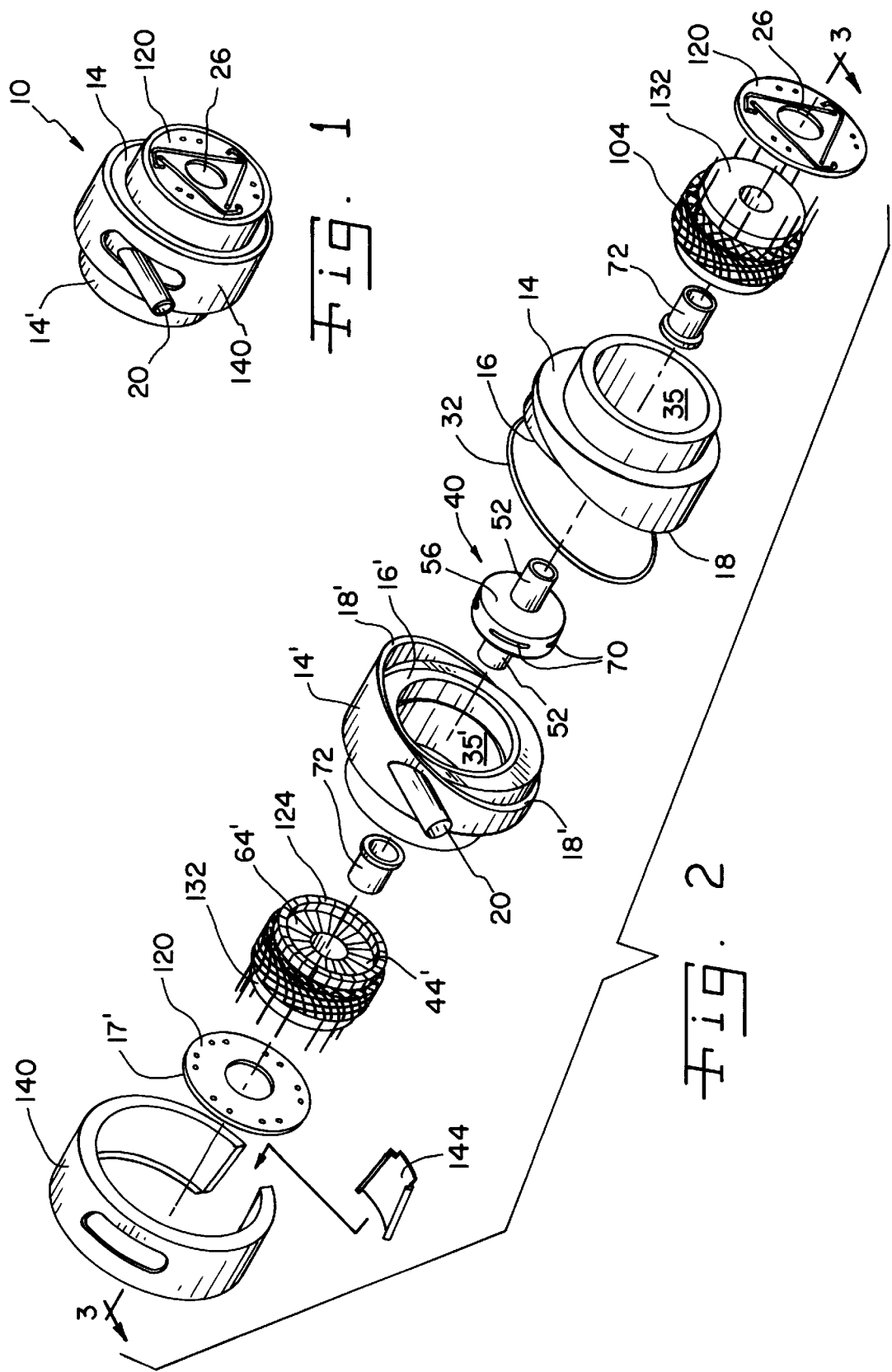

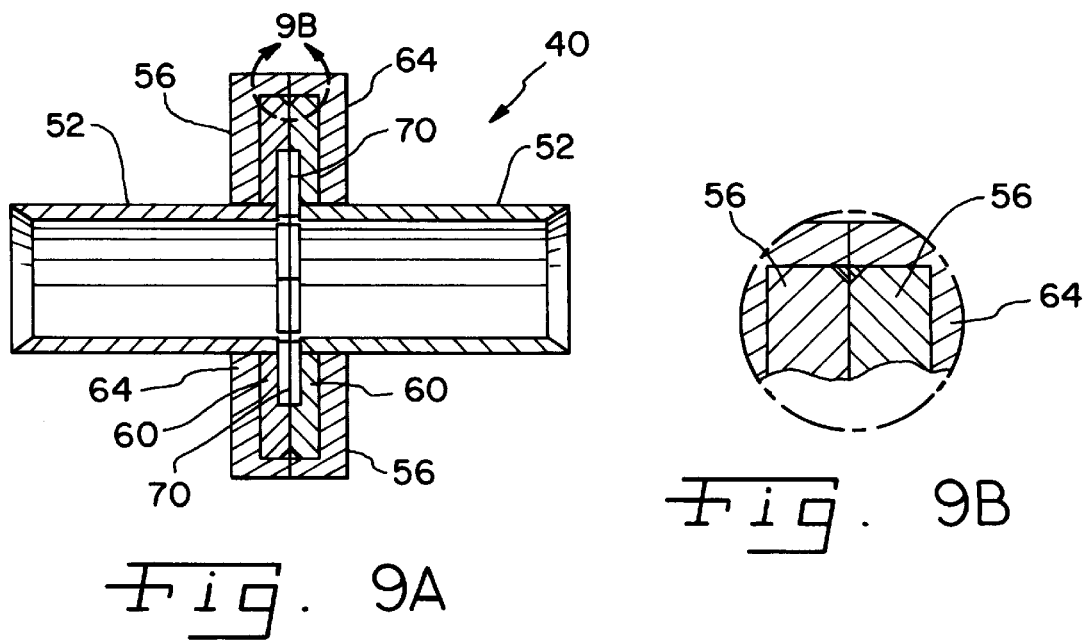
Fig. 9A
Fig. 9B
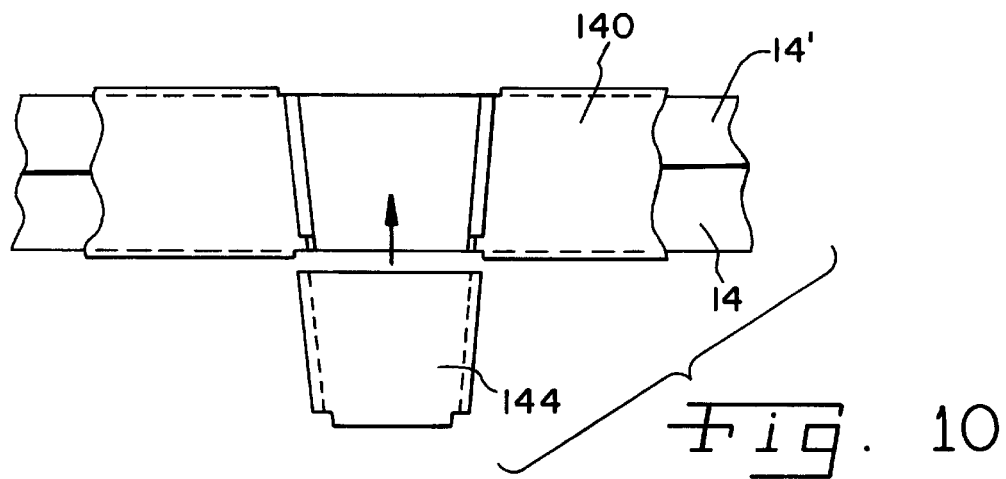
Fig. 10
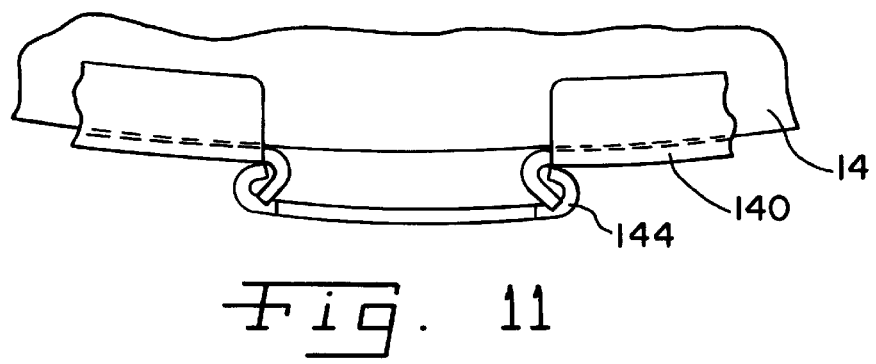
Fig. 11

LOW FLOW-RATE PUMP

BACKGROUND OF THE INVENTION

1. Field of the Invention

The present invention relates to centrifugal pumps. More specifically, the present invention relates to a centrifugal pump to provide low flow-rates and moderate pressures with a relatively low power consumption.

2. Description of the Prior Art

Solar Domestic Hot Water (SDHW) systems typically include a circulating pump for circulating water in the collection loop. It is desired that this pump be powered by solar energy, in the form of electricity from a photovoltaic cell array.

In SDHW, the required flow-rate is relatively low, typically being from about 0.5 to about 1.5 liters per minute of water at a desired pressure of from about 0.5 to about 2.5 atmospheres. Accordingly, if a sufficiently efficient pump is obtained, it will be possible to circulate the water in the collection loop with electricity provided from a photovoltaic cell array.

Of course, an additional concern in applications such as SDHW is that the pump be reliable and have a long service life, requiring little or no maintenance. Further, it is desired that the cost of manufacturing the pump not be excessive.

Centrifugal pumps are well known and have been designed for a variety of application including medical, food industry, chemical process and domestic use, to name a few. Typically, centrifugal pumps are designed as a two piece unit with a motor in communication with a fluid impeller via a connecting shaft. These pumps typically operate on standard, 60 Hertz alternating current and thus are subject to a maximum rotational speed of 3,600 revolutions per minute.

As is known to those of skill in the art, the no-flow pressure of a centrifugal pump is determined by the peripheral speed of the impeller. A large radius impeller will give a higher pressure than a small radius impeller at the same rpm speed. However, a large radius impeller inherently has too much parasitic area and generally too much flow area. Consequently, the large radius impeller wastes too much power and can produce too much flow at a given pressure. Thus, conventional low speed centrifugal pumps are not suitable for applications such as SDHW when low power consumption is desired at low flow rates.

If the flow-rate of a centrifugal pump is lowered by decreasing the radius of the impeller, the impeller speed must be raised to provide the desired pressure. Accordingly, centrifugal pumps with high speed motors are also known and often employ direct current, brush-type motors. A problem with this latter type of pump is that due to the elevated speeds of 10,000 RPM or more, bearings, seals and bushings in the pump suffer shortened life spans necessitating frequent repairs and resulting in higher operating costs. To mitigate the shortened life span of these components, it is known to employ "heavy duty" varieties of these components but this typically results in an increase in the friction losses of the pump which results in decreased overall efficiency of the pump, as well as an increased cost of manufacture.

A large number of pumps have been described in the prior art. In particular, U.S. Pat. No. 5,209,650 to Lemieux teaches an integral motor and pump that combines the rotor and the impeller into one member. In one embodiment, the pump is of the axial-type and includes a rotor disposed centrally about a hollow shaft and located between inlet and outlet vanes. The interior of the shaft is provided with screw type vanes rotatable with the rotor relative to a fixed stator. The impeller is sealed from the rotor assembly with hydrostatic radial and thrust bearings. One problem with axial-type pumps having one inlet and one outlet is that due to the hydraulic imbalance across the impeller, the bearings and seals operate in an unbalanced condition and are prone to wear, leakage and frictional losses.

U.S. Pat. No. 3,870,438 to Dannenmann et al. discloses an axial-type pump with an curved vane impeller mounted on one end of a hollow shaft rotor. As with the Lemieux reference, fluid is pumped through the shaft of the rotor across the length of the pump. This device employs annular sealing rings subject to a hydraulic imbalance similar to Lemieux which again results in wear, leakage and frictional losses.

As best understood by the present inventor, U.S. Pat. No. 5,195,877 to Kletschka teaches a dual inlet centrifugal pump for medical applications comprising an integral rotor-impeller member levitated on magnetic bearings. The stator is fixed upon a centrally located shaft and a hollow disc-shaped rotor-impeller surrounds the stator and is rotatable about the shaft. Rotation of the rotor-impeller draws fluid into the rotor-impeller from the inlets which are adjacent the center of the disc and discharges the fluid from outlets on the edge of the disc. While this pump does not suffer from the above-described problems which result from hydraulic imbalance, the pump is only designed to operate efficiently for low pressure at large flow-rates. As the pump is not provided with seals, its bearings suffer from back-leakage at moderate pressures which reduces its efficiency.

As is apparent from the above-description of the prior art, the pumps which have heretofore been available are unsuitable for providing an adequate ratio of pressure to flow with low power consumption and/or suffer from reliability problems.

SUMMARY OF THE INVENTION

It is an object of the present invention to provide a novel pump which obviates or mitigates at least one of the disadvantages of the prior art pumps.

According to one aspect of the present invention, there is provided a centrifugal pump comprising: a stator including two half-stator assemblies, each said half-stator assembly comprising a plurality of electromagnetic coils arranged about a central aperture to form at least two magnetic poles, each coil having a like number of poles, spacers of magnetic permeable material being mounted in said coils; a rotor-impeller assembly comprising a longitudinal hollow member forming two inlets and a rotational axis and a rotor-impeller disc fixed to said hollow member and presenting a substantially circular aspect to said stator, said rotor-impeller disc being magnetized to present a number of alternating magnet poles to said stator, said number being equal to the number of poles in said coils, and said rotor-impeller disc including at least two fluid passages communicating between the interior of said hollow member and the periphery of said rotor-impeller; a housing including two opposed inlet ports, an outlet port, a pump volute and a cavity to receive said half-stator assemblies such that said central aperture in each coil is aligned with a respective one of said opposed inlet ports; a pair of bearing means, each bearing means located within a respective one of said central apertures and operable to receive said rotor-impeller to allow said rotor-impeller to rotate in said bearings in said pump volute between said half-stator assemblies wherein when operating, fluid is drawn into said inlet ports and forced out of said outlet port by rotation of said rotor-impeller.

According to another aspect of the present invention there is provided a centrifugal pump comprising; a stator; a rotor-impeller assembly including a hollow member forming a rotational axis and a permanent magnet rotor-impeller fixed thereto, said rotor-impeller having a radius of from between about 5 mm to about 30 mm and having at least two radial passages communicating between the interior of said hollow member and the periphery of said rotor-impeller; a housing including two opposed fluid inlets and one fluid outlet and a cavity to receive said stator; bearing means to rotatably receive said rotor-impeller assembly such that each of said two fluid inlets is in fluid communication with a respective end of said hollow member and said one fluid outlet is adjacent the periphery of said rotor-impeller.

According to another aspect of the present invention, there is provided a solar domestic hot water system comprising: a solar energy collection panel for heating fluids, including a fluid inlet and outlet, a primary fluid reservoir, a fluid to fluid heat exchanger having a primary loop and a secondary loop, said primary loop connected between said solar energy collection panel outlet and said primary fluid reservoir, a domestic water reservoir connected across said secondary loop of said fluid to fluid heat exchanger to form a thermo-syphon, a pump connected between said primary fluid reservoir and said solar energy collection panel inlet, comprising: a stator including two half-stator assemblies, each said half-stator assembly comprising a plurality of electromagnetic coils arranged about a central aperture to form at least two magnetic poles, each coil having a like number of poles, spacers of magnetic permeable material being mounted in said coils; a rotor-impeller assembly comprising a longitudinal hollow member forming two inlets and a rotational axis and a rotor-impeller disc fixed to said hollow member and presenting a substantially circular aspect to said stator, said rotor-impeller disc being magnetized to present a number of alternating magnet poles to said stator, said number being equal to the number of poles in said coils, and said rotor-impeller disc including at least two fluid passages communicating between the interior of said hollow member and the periphery of said rotor-impeller; a housing including two opposed inlet ports, an outlet port, a pump volute and a cavity to receive said half-stator assemblies such that said central aperture in each coil is aligned with a respective one of said opposed inlet ports; and a pair of bearing means, each bearing means located within a respective one of said central apertures and operable to receive said rotor-impeller to allow said rotor-impeller to rotate in said bearings in said pump volute between said half-stator assemblies wherein when operating, fluid is drawn from said primary fluid reservoir into said two opposed inlet ports and forced out of said outlet port of said pump by rotation of said rotor-impeller and delivered to said solar energy collection panel inlet; and a control system and power supply for said pump, said control system responsive to the temperature of said primary fluid at said solar energy collection panel outlet and the temperature of said domestic water entering said secondary loop to energize and de-energize said pump.

Preferably, the present invention comprises a centrifugal pump which provides a flow of water with moderate pressure (from about 0.5 to about 2.5 atmospheres) at a low flow-rate (from about 0.5 to about 1.5 liters of water per minute) in a relatively energy efficient manner. As such, the pump of the present invention is particularly suited for circulating water through a collector loop in SDHW systems. It is also contemplated that the present invention will have utility in other applications wherein a relatively energy efficient pump is required to provide a low rate, moderate pressure flow.

In its presently preferred embodiment, the pump comprises a rotor-impeller with a physical radius of about 5.5 mm and a weight of about 2.7 grams. The rotor-impeller is driven by a pulse width modulated (PWM) power supply which provides power at a frequency up to about 3 kHz to an eight pole stator and thus the motor operates at a speed of up to about 50,000 RPM. A pump which has been constructed in accordance with the presently preferred embodiment produces a flow-rate of 1.3 liters per minute at a pressure of 0.9 atmospheres for an input of about 13 watts of power. It is contemplated that the above-identified output can be achieved with as little as about 10 watts input.

BRIEF DESCRIPTION OF THE DRAWINGS

A presently preferred embodiment of the present invention will now be described, by way of example only, with reference to the accompanying drawings, in which:

FIG. 1 shows a perspective view of a pump, in accordance with the present invention;

FIG. 2 shows an exploded view of the pump of FIG. 1;

FIG. 9 shows a section through an assembled rotor-impeller;

FIG. 10 shows a side view of a portion of a clamp and retaining clip employed to secure two halves of a pump housing;

FIG. 11 shows a top view of a portion of the clamp and retaining clip fully assembled;

DETAILED DESCRIPTION OF THE PREFERRED EMBODIMENTS

Figure 3:
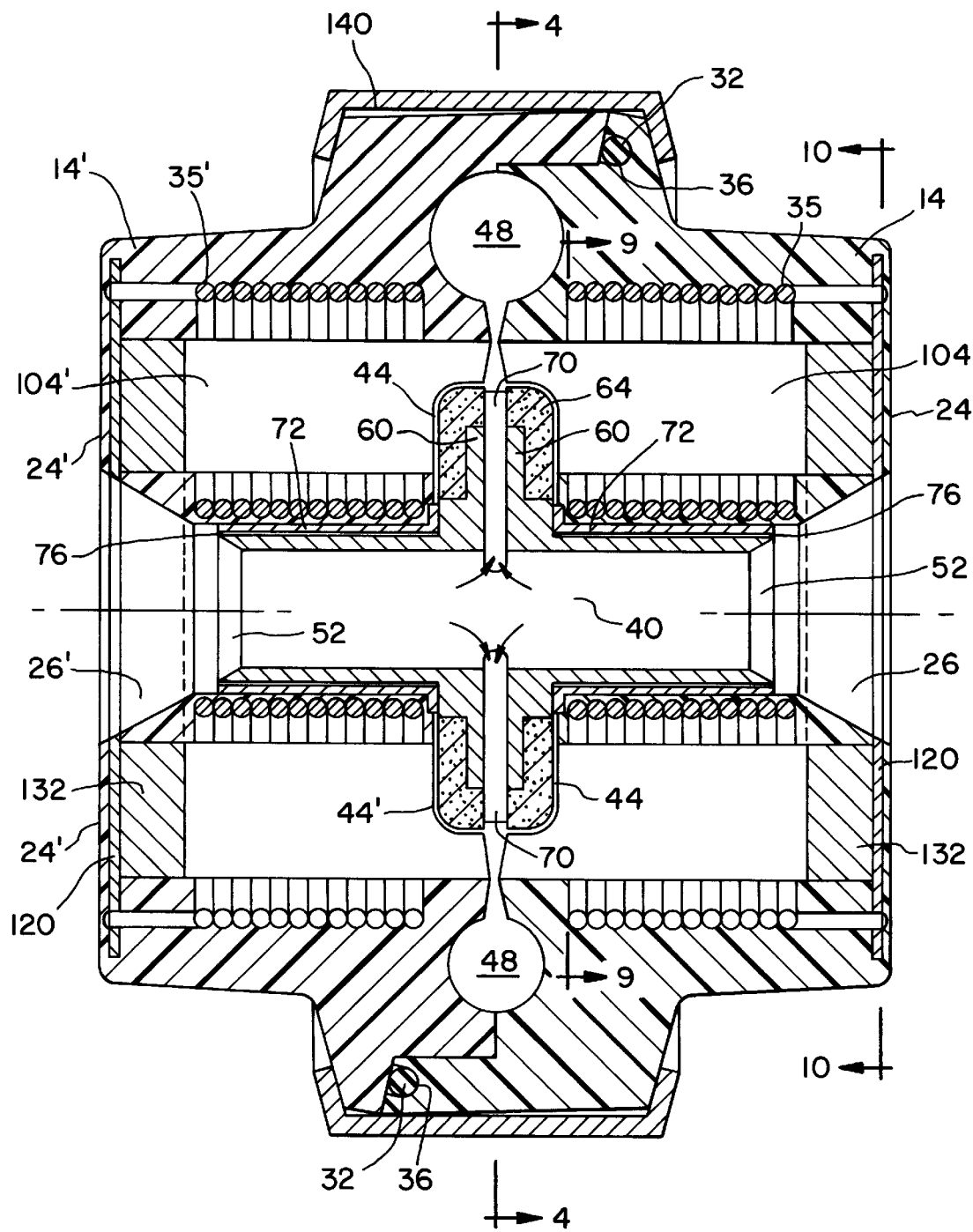
FIG. 3 shows a section view of the pump along a line 3—3 of FIG. 2.

A pump in accordance with the present invention is indicated generally at 10 in FIGS. 1 and 2. In the following description, pairs of components which are similar in construction will be identified with non-primed and primed numbers (i.e.—9,9') for convenience.

Pump 10 generally comprises a pair of housing members 14,14', a rotor-impeller assembly 40, a pair of half-stator assemblies 104,104' and a ring clamp 140. Housing members 14,14' are generally circular in cross-section are preferably formed from a polymer material. Each housing member 14,14' is provided with an inner surface 16,16' which inter-engage in a complementary manner and which are substantially perpendicular to a longitudinal axis through the center of pump 10. A mating edge 18,18' is formed at an oblique plane through the longitudinal axis of pump 10 which enables an outlet 20 to extend outwardly from housing member 14' while straddling the engagement point of inner surfaces 16,16'.

As shown in FIGS. 2 and 3, an O-ring 32 is disposed in a groove 36 provided on surface 16 which substantially inhibits fluid from passing outwardly toward edges 18,18'. Each housing member 14,14' further comprises a generally flat outer wall 24,24' provided with an inlet 26,26' which are substantially coaxial with the longitudinal axis of pump 10. Inlets 26,26' are provided with a conical aperture which tapers inwardly from outer wall 24,24' and through which fluid may be introduced to rotor-impeller assembly 40.

Figure 4:
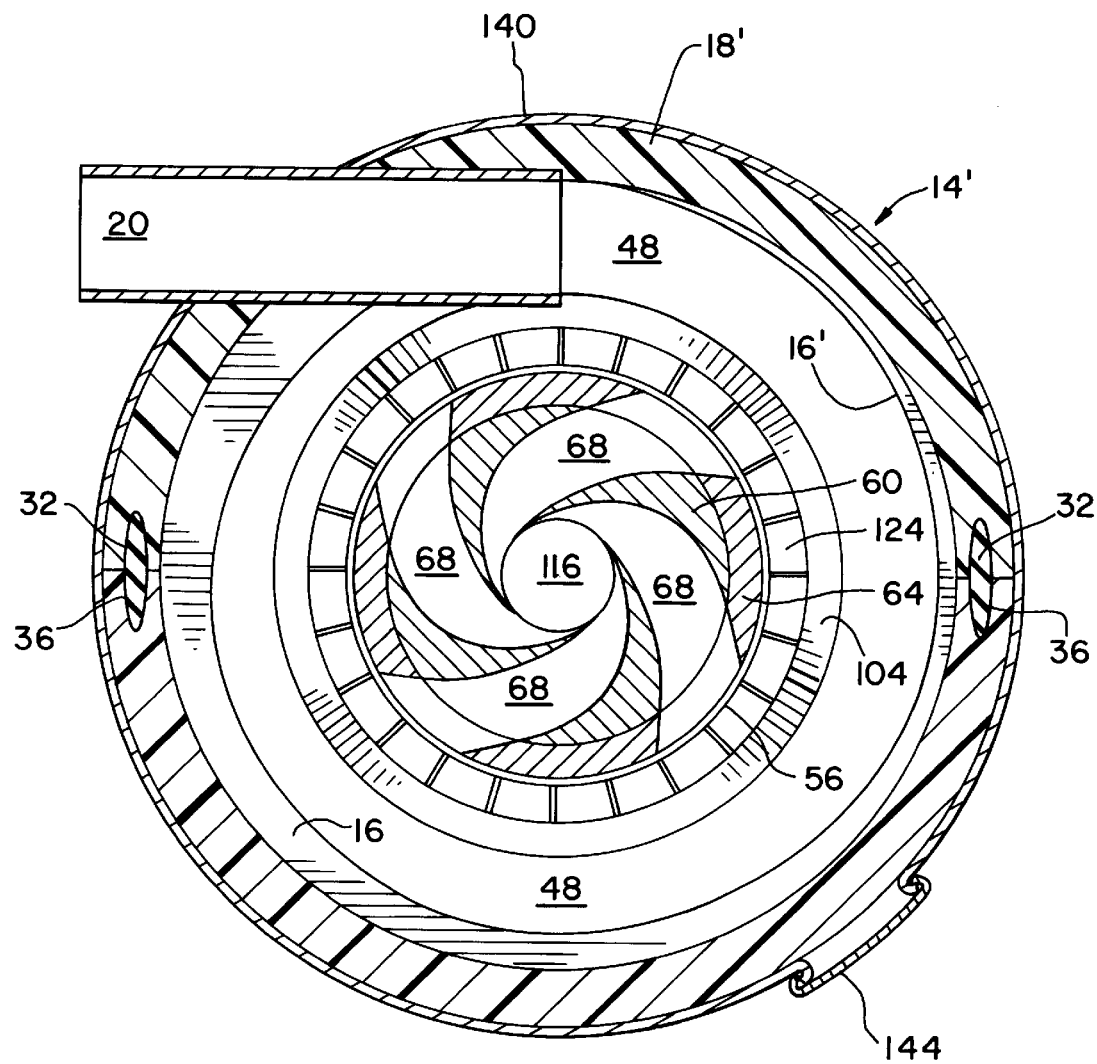
FIG. 4 shows a section view of the pump along a line 4—4 of FIG. 3.

A coaxially disposed recess 44 is provided in housing member 14 to receive half-stator assembly 104. Similarly, housing member 14' also includes a coaxially disposed recess 44' in which second half-stator assembly 104' is received. When housing members 14,14' are assembled, pump volute 48 is formed by mating surfaces 16,16', as shown in FIG. 4. Pump volute 48 comprises a generally spiral fluid passage extending tangentially into outlet 20.

It is generally desired that the combination of the two half-stators 104,104' result in a stator which makes efficient use of its volume (i.e.—generate a large magnetomotive force (mmf) for the volume occupied) while still allowing for practical construction of the stator. In the presently preferred embodiment, the stator comprises an eight pole, three phase stator.

Figure 5:
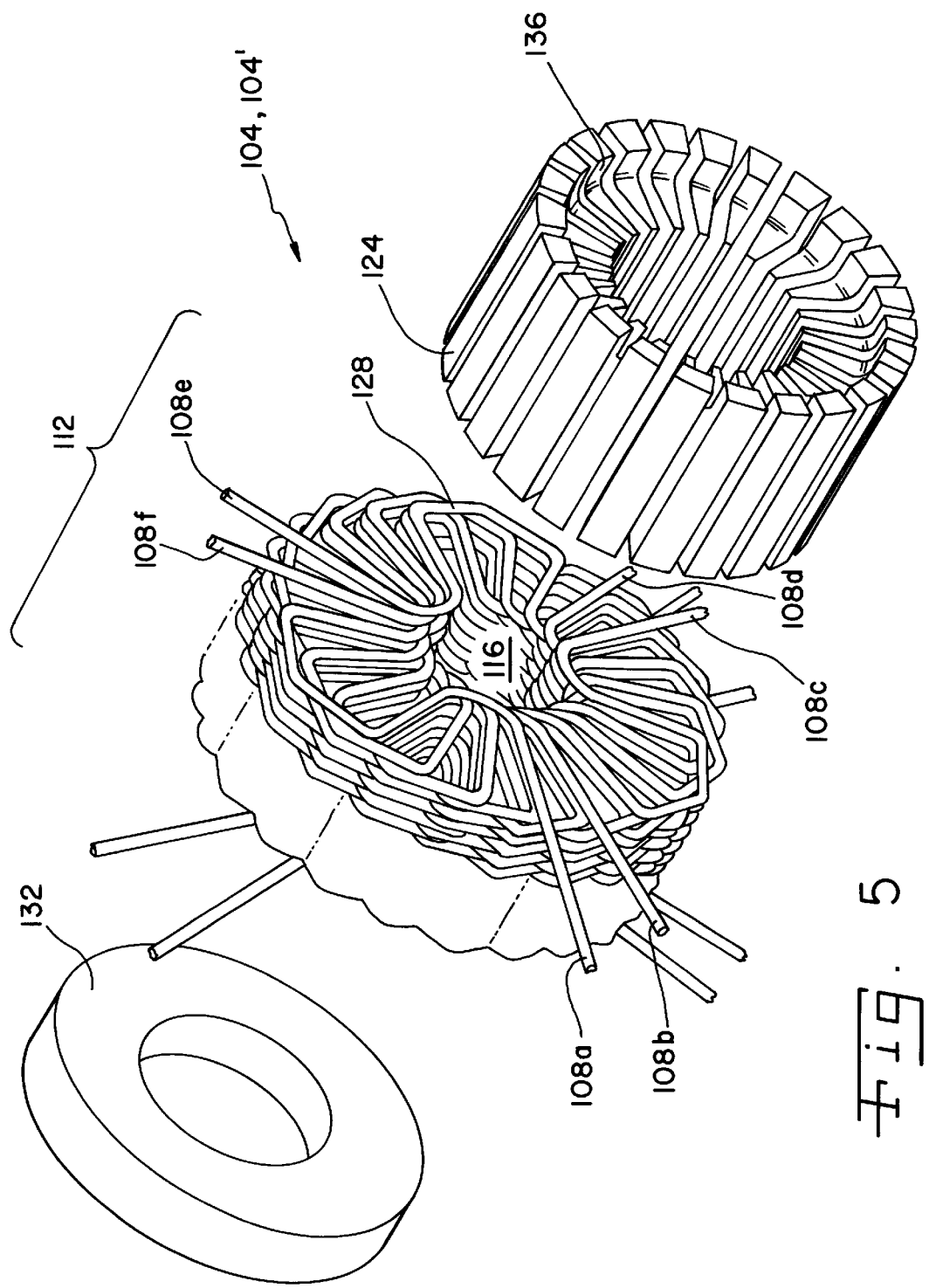
FIG. 5 shows an exploded view of a half-stator assembly including windings, magnetic spacers and an annular magnetic disc.

As indicated above, the stator is formed from two half-stators assemblies 104,104'. As best seen in FIG. 5, each half-stator assembly 104,104' comprises a plurality of magnetic spacers, which in the preferred embodiment are in the form of bars 124 of permeable magnetic material, a coil structure 112, an annular disc 132 formed from a permeable magnetic material and a rear panel 120 (shown in FIGS. 2 and 6).

Figure 6:
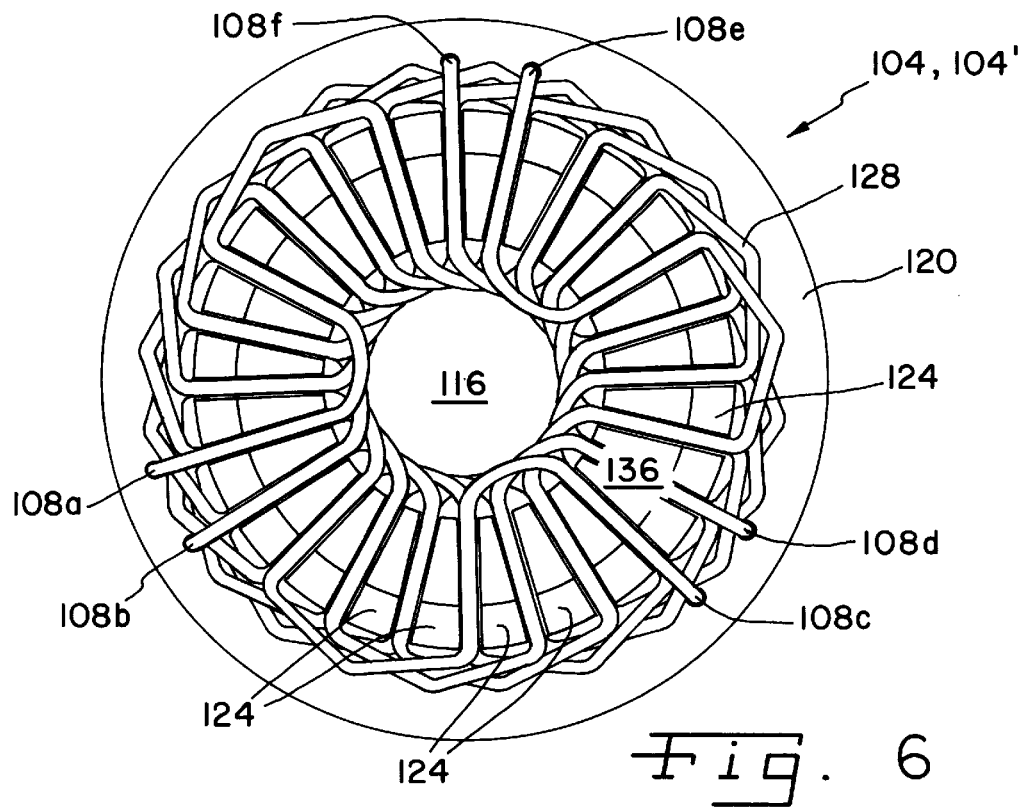
FIG. 6 shows a front view of the half-stator assembly of FIG. 8 fully assembled.

As best seen in FIGS. 5 and 6, coil structure 112 is fabricated from six coil windings, 108a, 108b, 108c, 108d, 108e and 108f. Coil windings 108 start as six parallel wires which are each wrapped in a helical manner around a generally cruciform-shaped form (not shown) resembling a "four-leaf clover" through six revolutions. The identifiers a through f refer to the top to bottom order of the windings on the form, with 'a' being the top wire and 'f' being the bottom wire with 'b' being the wire below 'a' and above 'c', etc. Coil windings 108 are pulled off the form so that the cruciform-shaped windings can be oriented with respect to one another. Specifically, coil winding 108f is rotated counter-clockwise 15 degrees with respect to coil winding 108e. Coil windings 108c and 108d are similarly rotated 15 degrees with respect to each other and are then rotated 120 degrees, as a pair, clockwise with respect to coil windings 108e and 108f. Similarly, coil windings 108a and 108b, are rotated 15 degrees with respect to each other and are rotated 120 degrees, as a pair, with respect to coil windings 108c and 108d to complete the coil structure 112.

The resulting coil structure 112 is generally circular with a centrally located coil aperture 116 and each coil winding 108 terminates in a pair of free ends which extend outwardly. Coil windings 108 are then compressed to reduce the height of coil structure 112.

As shown in FIGS. 5 and 6, a bar 124 of magnetic permeable material is next placed adjacent to the outer diameter of coil structure 112 in each of the gaps located between coil loops 128 formed by windings 108. For the preferred eight pole, three phase coil structure 112, twenty-four bars 124 and six windings 108 are required. To complete the magnetic circuit of half-stator assemblies 104,104', one end of each of bars 124 is flattened by a suitable machining process (such as diamond grinding) and annular disc 132 of magnetic permeable material is bonded to the flattened end of bars 124. The end of each of bars 124 opposite annular disc 132 is provided with an inset 136 which forms a portion of recess 44 and receives one half of rotor-impeller assembly 40. In the preferred embodiment, bars 124 and annular disc 132 are fabricated from a ceramic magnetic composition such as ferrite.

Figure 7:
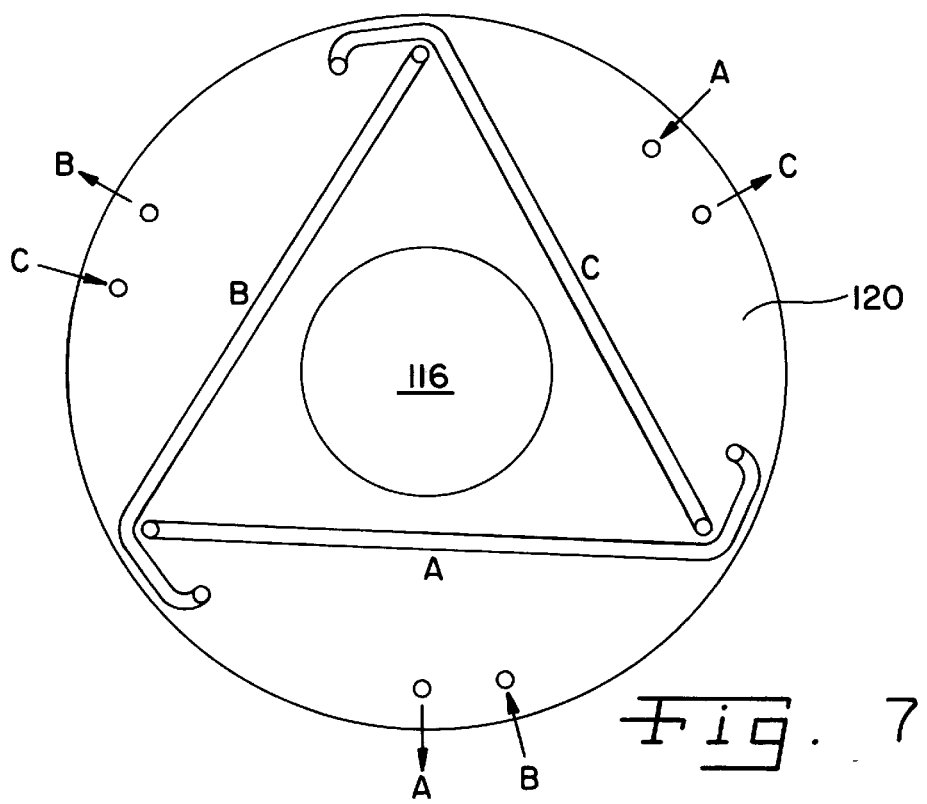
FIG. 7 shows a rear view of the half-stator assembly including an attached rear panel which provides connection points for the windings.
Figure 12:
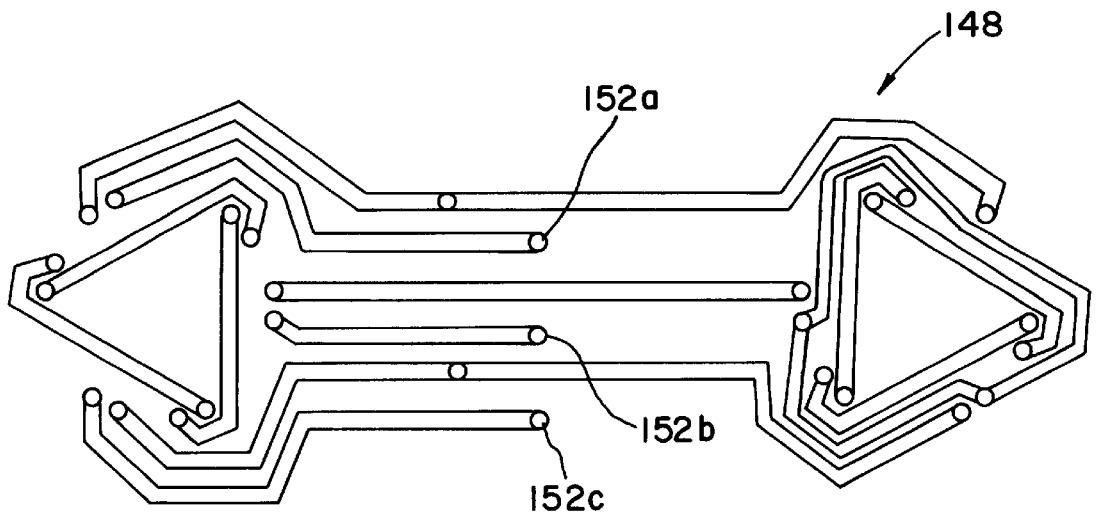
FIG. 12 shows the layout of a flexible circuit board used to make electrical connections to half-stator assemblies.

To complete assembly of half-stator assembly 104, the free ends of each coil winding are bent so that they extend rearwardly and engage a flexible circuit board 148 adjacent annular disc 132, shown in FIG. 12, where the required electrical interconnections connections are completed. As shown in FIG. 7, each end of flexible circuit board 148 connects the six coils windings 108 to form three phases A, B and C of each half-stator 104,104'.

In the preferred embodiment, housing members 14,14' are formed through an injection moulding process such that each half-stator assembly 104, 104' is embedded within recesses 35,35' during the moulding process and the electrical connections, from rear panels 120, extend through housing members 14,14'. When both half-stator assemblies 104,104' are properly fixed in housing members 14,14', each coil aperture 116,116' is coaxially aligned with the longitudinal axis of pump 10 and communicates with inlets 26,26'.

Figure 8:
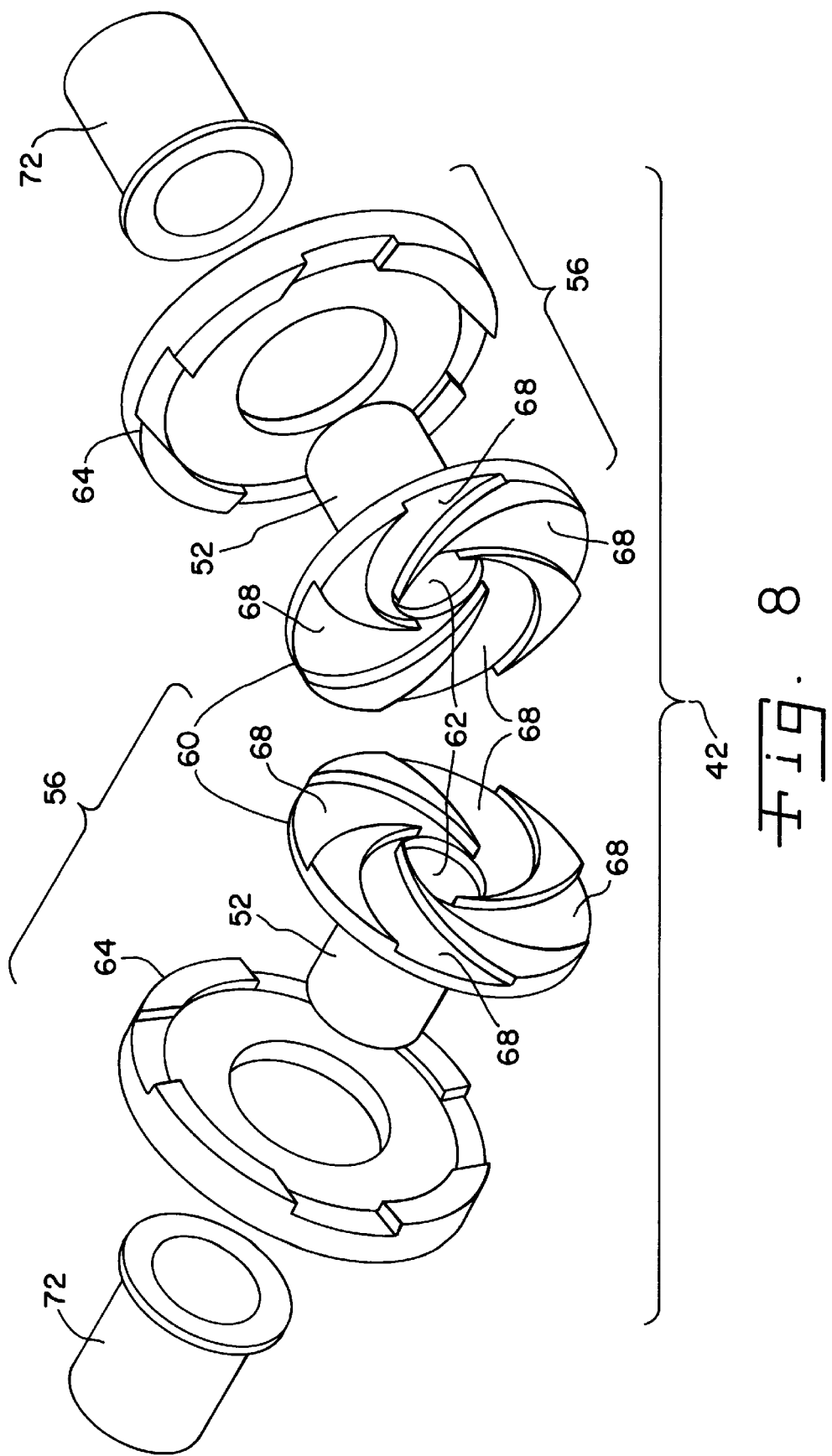
FIG. 8 shows an exploded perspective view of the components of a rotor-impeller with a pair of bearings.

As shown in FIGS. 8 and 9, rotor-impeller assembly 40 comprises a pair of stainless steel hollow shafts 52 which are rigidly attached to a rotor-impeller disc 56. Rotor-impeller disc 56 is fabricated in two halves, each of which halves includes a magnetically permeable metal core 60 in the form of a disc provided with a centrally located aperture 62 and each shaft 52 is fixed to each core 60 with aperture 62 aligned with the interior of shaft 52.

The face of each core 60 opposite that to which shaft 52 is attached is machined to form four spiral grooves 68 which extend from aperture 62 to the periphery of core 60. The machined surfaces of each core 60 are welded together at their peripheral edge with spiral grooves 68 in each half being aligned to form four spiral flow channels 70 extending from central aperture 64 to the periphery of rotor-impeller disc 56. In this manner, hollow shaft 52 communicates with spiral flow channels 70 such that fluid entering the ends of hollow shaft 56 exits via the periphery of rotor-impeller disc 56.

It is contemplated that although the spiral shape of flow channels 70 aids in reducing frictional losses, radial passageways could also be employed as would be apparent to one of skill in the art. It is also contemplated that more or less than four flow channels may be provided if desired.

A pair of machined caps 64 of rare earth metal-alloy material are then bonded to the peripheral edge and back of welded disc 56. Caps 64, which are magnetized prior to assembly, provide rotor-impeller disc 56 with the desired magnetic characteristics required to function as a rotor.

In the preferred embodiment, the rare earth metal-alloy is a neodymium-boron-iron alloy, $(Nd_3BFe_{14})$ which has been selected for cost and magnetic strength. The method of bonding caps 64 to disc 56 is not particularly limited and in the preferred embodiment a liquid resin binder has been employed. As the iron content of the alloy may suffer from continuous immersion in the working fluid, a protective coating (such as electroplated nickel) may be applied to caps 64, either prior to or after they are bonded to disc 56.

It is contemplated that other materials, such as a samarium alloy such as samarium-cobalt ($SmCo_5$ or $Sm_2Co_{17}$), can advantageous be employed to form rotor-impeller disc 56 depending on the corrosive characteristics of the working fluid. Specifically, it is contemplated that a samarium-cobalt alloy will provide both the necessary magnetic characteristics for the rotor and sufficient corrosion resistance. Further, as is understood by those of skill in the art, such materials can be fabricated into a disc by sintering and pressing rather than by chemical bonding. However, as will be apparent to those of skill in the art, the safe fabrication and machining of a samarium-cobalt alloy is more difficult to accomplish than that of the presently preferred embodiment.

While the presently preferred embodiment is an eight pole motor, it will be understood by those of skill in the art that a different number of poles may be employed as desired, as long as the number of poles in the rotor matches the number in the stator.

As best seen in FIG. 9, rotor-impeller assembly 40 is generally symmetrical about its longitudinal and lateral axes which is advantageous in that no unbalanced magnetic or hydraulic forces are sustained under normal operating conditions. In the presently preferred embodiment, rotor-impeller disc 56 has an outer diameter of about 11 mm and the mass of rotor-impeller assembly 40 is about 2.7 grams. It is contemplated that other pumps may be manufactured in accordance with the present invention with rotor-impeller radii ranging from under about 2.5 mm with corresponding stator sizes.

Assembly of pump 10 now proceeds with a pair of bearings 72 being inserted through each coil aperture 116, 116'. Each bearing 72 is a cylindrical sleeve-type bearing which is coaxially aligned with inlet ports 26,26' and whose inner diameter is selected to be about 40 microns larger than the outer diameter of hollow shaft 52 to provide a suitable working clearance. Preferably, bearings 72 are formed from a material such as Delrin® and the like. After bearings 72 are inserted, rotor-impeller assembly 40 is inserted into housing members 14,14' such that one end of each of hollow shaft 52 enters a bearing 72.

It is contemplated that bearings 72 will serve both as bearings for rotor-impeller assembly 40 and as outlet-to-inlet labyrinth seals. However, the clearance between bearings 72 and hollow shaft 52 is selected to be sufficiently large such that the hydraulic pressure differential across the bearing ensures that a minute amount of leakage of fluid will result to ensure adequate flooding of the bearings while preventing significant back-leakage through pump 10. It is contemplated that wear of bearings 72 will only occur during start-up or shutdown of pump 10 as the bearings will be substantially flooded at all other times.

As best shown in FIGS. 10 and 11, assembly of pump 10 is completed by placing clamp 140 around housing members 14,14' which brings mating surfaces 16,16' into abutment and O-ring 32 in sealing engagement. A retaining clip 144 is then slidably attached to clamp 140 to tension clamp 140 and compress O-ring 32, thereby sealing pump 10.

When pump 10 is assembled, rotor-impeller assembly 40 is freely rotatable relative to half-stator assemblies 104,104' within housing 14. Bearings 72 are located with respect to half-stator assemblies 104,104' and housing members 14,14' such that a substantially constant air gap and clearance 76 is maintained between rotor-impeller assembly 40 and half-stator assemblies 104,104'. When pump 10 is in use, air gap and clearance 76 is filled with the fluid to be pumped.

As will be readily discerned, in operation, fluid enters both ends of hollow shaft 52 via inlets 26,26' and exits through spiral flow channels 70 and out of pump 10 through outlet 20. Thus, as mentioned above, hydraulic and mechanical forces on rotor-impeller 40 due to fluid movement are substantially balanced.

In the presently preferred embodiment, each half-stator assembly 104,104' is connected to the other via a flexible circuit board 148 shown in FIG. 12. Each end of circuit board 148 attaches to the ends of coil windings 108 for a respective one of half-stator assemblies 104 and electrical connections from the power supply (not shown) to pump 10 are established via contacts 152a, 152b, and 152c.

The power supply, mounted external of pump 10, preferably employs a CMOS controller coupled to a MOSFET power driver to provide a pulse width modulated (PWM) voltage to pump 10. Such PWM power supplies are well known to those of skill in the art and will not be further discussed herein.

In tests of the presently preferred embodiment, at 28,000 RPM pump 10 delivered a flow of 1.3 liters per minute at a pressure of 0.9 atmospheres with a power consumption of about 13 W. At 43,000 RPM and no flow, pump 10 produced a pressure of 2.2 atmospheres and also consumed about 13 W of power. Pump 10 can operate at a speed of up to at least about 50,000 RPM.

Figure 13:
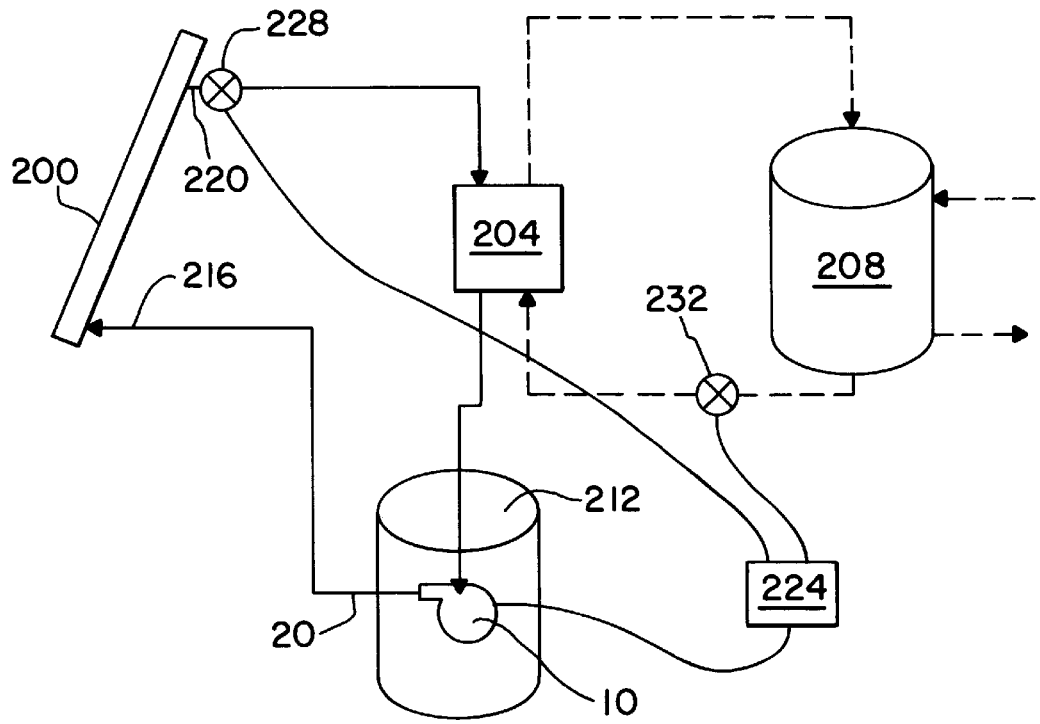
FIG. 13 shows a block diagram of a solar domestic hot water system employing the present invention; and, FIG. 14 shows a forming roller and a coil compressor for use with a coil former.

As previously mentioned, one contemplated use for pump 10 is in a SDHW system. In one configuration shown in FIG. 13, a SDHW system generally comprises a conventional fluid solar panel 200, an external counter-flow heat exchanger 204 and a hot water storage tank 208. In this configuration, heat is transferred to domestic hot water via heat exchanger 204 from a working fluid circulating through solar panel 200 in a closed loop. Pump 10 is submersed in a reservoir 212 used to store the working fluid and outlet 20 is connected to the inlet 216 of solar panel 200. Heat exchanger 204 has a primary side which is connected between the outlet 220 of solar panel 200 and the return to the reservoir. The secondary side of the heat exchanger forms a portion of a thermo-syphon loop with hot water storage tank 208 and circulates domestic water requiring heating. Pump 10 is connected to power supply and control unit 224 which include a pair of temperature probes 228, 232: probe 228 sensing fluid temperature at outlet 220; and probe 232 sensing inlet temperature of the domestic water.

In use, pump 10 circulates the working fluid comprising either water or an antifreeze mixture from the reservoir, through the solar panel and into the heat exchanger where heat is transferred to the domestic water in the thermosyphon loop. On leaving the heat exchanger the primary fluid returns to the reservoir. Pump 10 is controlled by the previously-described controller and temperature probes and is turned on and off in response to the temperatures of both the working fluid and domestic water.

It is contemplated that due to its small size and low power consumption requirements, pump 10 may be powered by a photovoltaic cell array. Accordingly, the power supply will receive direct current power from the photovoltaic cell array, although a back-up source of electricity may also be provided if needed.

Figure 14:
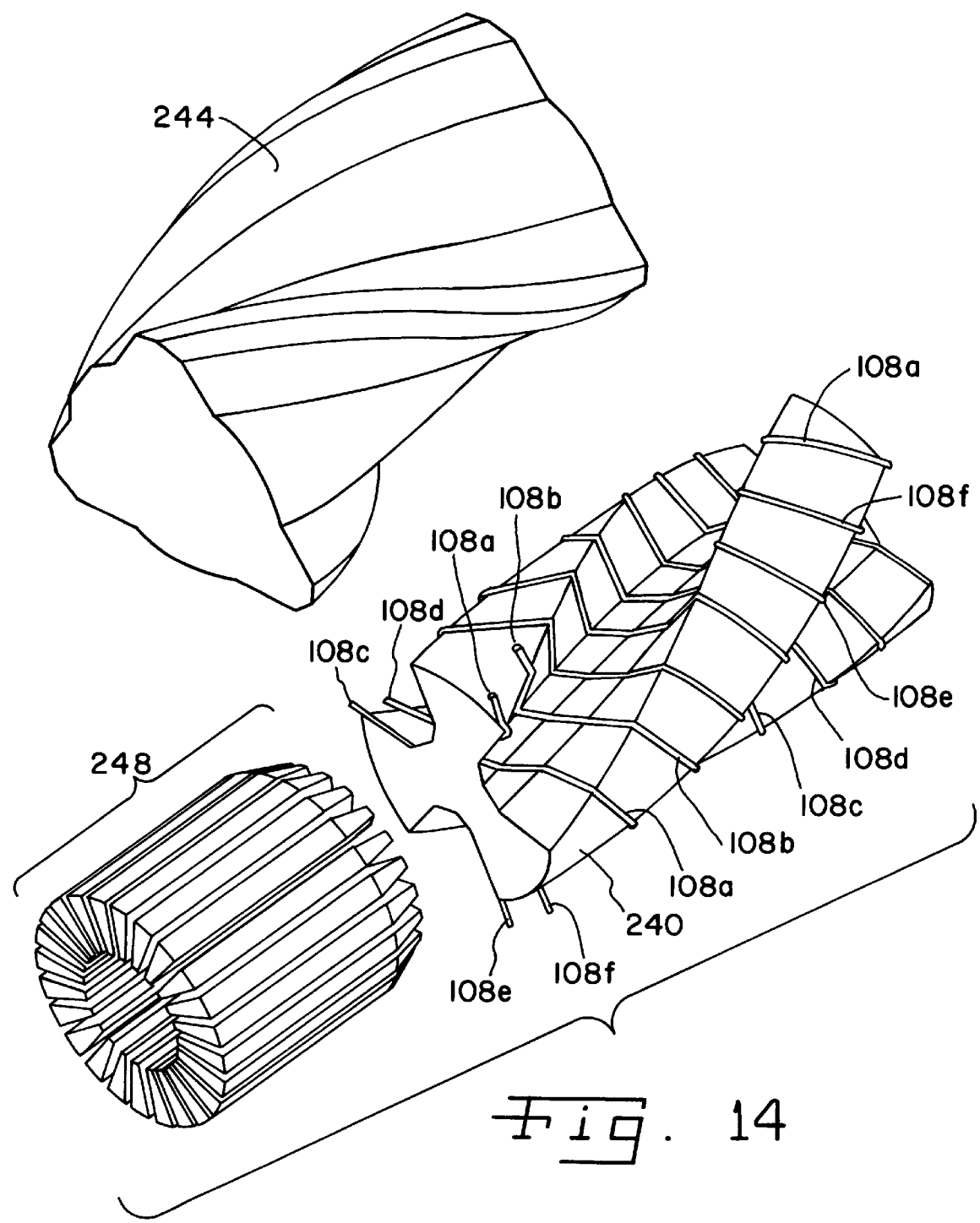

An alternate apparatus of fabricating coil windings 108 may be also employed. As shown in FIG. 14, six parallel wires are wound for six turns about a helical three-lobe form 240 which is preferably formed from a polished non-stick hard plastic material. This creates six coil windings 108a, 108b, 108c, 108d, 108e and 108f. As shown in the Figure, form 240 is a left-hand helix and the wires are wound about it in a right-hand helical manner.

A forming roller 244 is preferably formed of a rubber or plastic material and engages form 240 in a complementary manner to press and guide windings 108 into the recesses between the lobes such that windings 108 are formed into the three-lobe shape of form 240.

The helical angle of form 240 and the spacing between each of coil windings 108a to 108f is selected such that, as each coil winding 108 makes one 360° turn about form 240, each coil winding 108 crosses four lobes. Further, coil windings 108 are longitudinally spaced along form 240 such that the lobes formed in each coil winding (e.g. 108a) are positioned 15° from those of its neighbouring windings (e.g. 108b and 108f). This 15° rotation forms the gaps in the coil loops into which spacers 124 will be inserted. Further, each subsequent turn of winding 108 is advanced one magnetic pole pair of 90° with respect to its preceding turn as windings 108 proceed along form 240.

When the winding and forming is complete, a coil compressor 248, which comprises 24 pins which are sized to engage the above-mentioned gaps, is located adjacent one end of form 240. A suitable tool, such as a rubber gripper sleeve (not shown) is placed over windings 108 and is used to urge windings 108 off of form 240 and onto respective pins of coil compressor 248. As windings 108 are urged along form 240 to the pins of coil compressor 248, form 240 rotates with respect to the coil compressor. Specifically, after one set of winding turns is pressed between the pins of coil compressor 248, form 240 is rotated 15° relative to coil compressor 248 and the next set of winding turns 108 is pressed between the pins of coil compressor 248. Thus, adjacent sets of turns are located respectively, 1 pin (or 15°) apart.

Once all of the windings are in place on coil compressor 248, they are compressed along the pins of coil compressor 248 to reduce the axial length of the coil. When compressed, a suitable adhesive is applied to the windings to maintain their positioning and the pins of coil compressor 248 are removed. Spacer bars 124 (not shown in this Figure) are then inserted into the gaps in which the pins were located and the stator is completed as before.

The present inventor contemplates that the winding apparatus of FIG. 14 is particularly susceptible to automated manufacturing processes.

The present invention has been described with reference to a presently preferred embodiment. Other variations and embodiments of the present invention may be apparent to those of ordinary skill in the art. Accordingly, the scope of protection sought for the present invention is only limited as set out in the attached claims.

What is claimed is:

1. A centrifugal pump comprising:
   a stator including a pair of half-stator assemblies each having a like number of poles constructed from a plurality of coils arranged about a central aperture, bars of magnetic permeable material being inserted between portions of said coils;
   a rotor-impeller assembly including a hollow member forming a rotational axis and a permanent magnet rotor-impeller fixed to said hollow member, said rotor-impeller having a periphery, said rotor-impeller having a radius of between 5 mm to 30 mm and having at least two radial passages communicating between the interior of said hollow member and the periphery of said rotor-impeller;
   a housing including two opposed fluid inlets and one fluid outlet and a cavity to receive said stator;
   bearing means to rotatably receive said rotor-impeller assembly such that each of said two fluid inlets is in fluid communication with a respective end of said hollow member and said fluid outlet is adjacent the periphery of said rotor-impeller.

2. A centrifugal pump according to claim 1 wherein said permanent magnet rotor-impeller comprises an alloy selected from the group comprising $Nd_3BFe_{14}$, $SmCo_5$ and $Sm_2Co_{17}$.

3. A centrifugal pump comprising:
   a electromagnetic stator including two half-stator assemblies, each said half-stator assembly comprising a plurality of coils arranged about a central aperture, each half stator assembly having a like number of magnetic poles and spacers of magnetic permeable material being mounted between said coils in said half stator;
   a rotor-impeller assembly comprising a longitudinal hollow member rotatable about its longitudinal axis, each end of said member forming one of a pair of inlets with a rotor-impeller fixed to said hollow member and presenting a substantially circular aspect to said stator, said rotor-impeller disc being magnetized to present a number of alternating magnet poles to said stator, said number being equal to the number of poles in said half stator, and said rotor-impeller including at least two fluid passages communicating between the interior of said hollow member and the periphery of said rotor-impeller;
   a housing including two opposed inlet ports, an outlet port and a pump volute in communication therewith and a cavity to receive said half-stator assemblies such that said central aperture in each coil is aligned with a respective one of said opposed inlet ports;
   a pair of bearing means, each bearing means located within a respective one of said central apertures and operable to receive said rotor-impeller to allow said rotor-impeller to rotate in said bearings in said pump volute between said half-stator assemblies wherein, when operating, fluid is drawn into said inlet ports and forced out of said outlet port by rotation of said rotor-impeller.

4. A centrifugal pump according to claim 3 wherein said rotor-impeller disc comprises a metal core to which caps of permanent magnet material are bonded.

5. A centrifugal pump according to claim 4 wherein said caps comprise an alloy selected from the group comprising $Nd_3BFe_{14}$, $SmCo_5$ and $Sm_2Co_{17}$.

6. A centrifugal pump according to claim 4 wherein the radius of said rotor-impeller disc is in the range of from about 5 mm to about 30 mm.

7. A centrifugal pump according to claim 6 wherein the intended operating speed of said rotor-impeller disc is between about 10,000 and about 50,000 RPM.

8. A centrifugal pump according to claim 3 wherein said fluid passages are spiral.

9. A centrifugal pump according to claim 8 including four fluid passages.

10. A centrifugal pump according to claim 3 wherein said housing is formed in two portions, each of said portion moulded about one of said half stator assemblies.

11. A solar domestic hot water system comprising:

a solar energy collection panel for heating fluids, including a fluid inlet and outlet, a primary fluid reservoir, a fluid to fluid heat exchanger having a primary loop and a secondary loop, said primary loop connected between said solar energy collection panel outlet and said primary fluid reservoir, a domestic water reservoir connected across said secondary loop of said fluid to fluid heat exchanger to form a thermo-syphon, a pump connected between said primary fluid reservoir and said solar energy collection panel inlet, comprising: a stator including two half-stator assemblies, each said half-stator assembly comprising a plurality of electromagnetic coils arranged about a central aperture to form at least two magnetic poles, each coil having a like number of poles, bars of magnetic permeable material being mounted in said coils;

a rotor-impeller assembly comprising a longitudinal hollow member forming two inlets and a rotational axis and a rotor-impeller disc fixed to said hollow member and presenting a substantially circular aspect to said stator, said rotor-impeller disc being magnetized to present a number of alternating magnet poles to said stator, said number being equal to the number of poles in said coils, and said rotor-impeller disc including at least two fluid passages communicating between the interior of said hollow member and the periphery of said rotor-impeller;

a housing including two opposed inlet ports, an outlet port, a pump volute and a cavity to receive said half-stator assemblies such that said central aperture in each coil is aligned with a respective one of said opposed inlet ports; and a pair of bearing means, each bearing means located within a respective one of said central apertures and operable to receive said rotor-impeller to allow said rotor-impeller to rotate in said bearings in said pump volute between said half-stator assemblies wherein when operating, fluid is drawn from said primary fluid reservoir into said two opposed inlet ports and forced out of said outlet port of said pump by rotation of said rotor-impeller and delivered to said solar energy collection panel inlet; and a control system and power supply for said pump, said control system responsive to the temperature of said primary fluid at said solar energy collection panel outlet and the temperature of said domestic water entering said secondary loop to energize and de-energize said pump.

* * * * *